United States Statutory Invention Registration [19]

[11] Reg. Number: H121

Pieczykolan

[45] Published: Sep. 2, 1986

[54] QUICK RELEASE VALVE FOR SPRINKLER HEAD

[75] Inventor: George S. Pieczykolan, North Wales, Pa.

[73] Assignee: Central Sprinkler Corporation, Lansdale, Pa.

[21] Appl. No.: 722,084

[22] Filed: Apr. 11, 1985

[51] Int. Cl.[4] ..... A62C 37/08

[52] U.S. Cl. ..... 169/37

[58] Field of Search ..... 169/37–41, 169/90

[56] References Cited

U.S. PATENT DOCUMENTS

| | | | |
|---|---|---|---|
| 16,132 | 8/1825 | Loepsinger . | |
| 793,357 | 6/1905 | Diederici . | |
| 842,725 | 1/1907 | Taylor . | |
| 998,574 | 7/1911 | Hamilton | 169/39 |
| 1,700,591 | 1/1929 | Loepsinger . | |
| 1,797,919 | 3/1931 | Loepsinger . | |
| 1,996,077 | 4/1935 | Loepsinger . | |
| 2,085,987 | 7/1937 | Loepsinger . | |
| 2,247,241 | 6/1941 | Knight . | |
| 2,768,696 | 10/1956 | Sherburne . | |
| 3,253,657 | 5/1966 | Job . | |
| 3,918,645 | 11/1975 | Mohler | 169/37 X |
| 4,121,665 | 10/1978 | Woycheese | 169/38 |
| 4,167,974 | 9/1979 | Job | 169/38 |
| 4,217,961 | 8/1980 | Wotton | 169/41 |
| 4,343,364 | 8/1982 | Glinecke | 169/38 |

FOREIGN PATENT DOCUMENTS

| | | | |
|---|---|---|---|
| 1322179 | 7/1973 | United Kingdom | 169/38 |
| 1264262 | 3/1968 | Fed. Rep. of Germany | 169/37 |

*Primary Examiner*—Harold J. Tudor

*Attorney, Agent, or Firm*—Seidel, Gonda, Goldhammer & Abbott

[57] ABSTRACT

A quick release valve for a sprinkler head wherein a thermal compressive element is supported by a Belleville spring and a seal cap diverts fluid pressure to the spring periphery.

14 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG.2
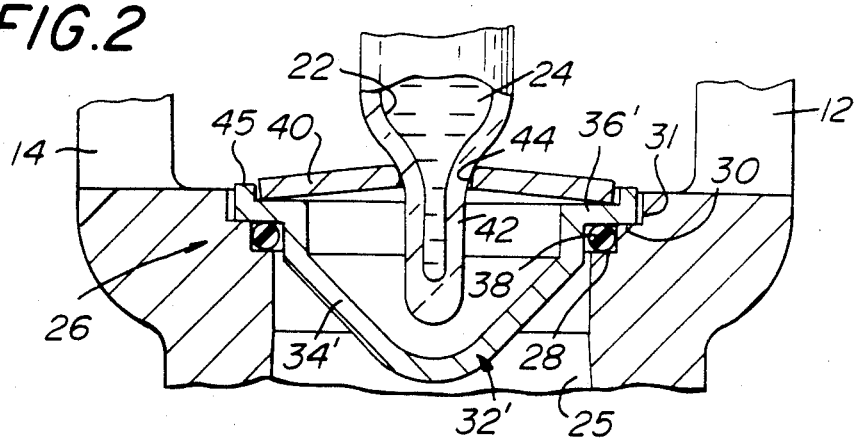
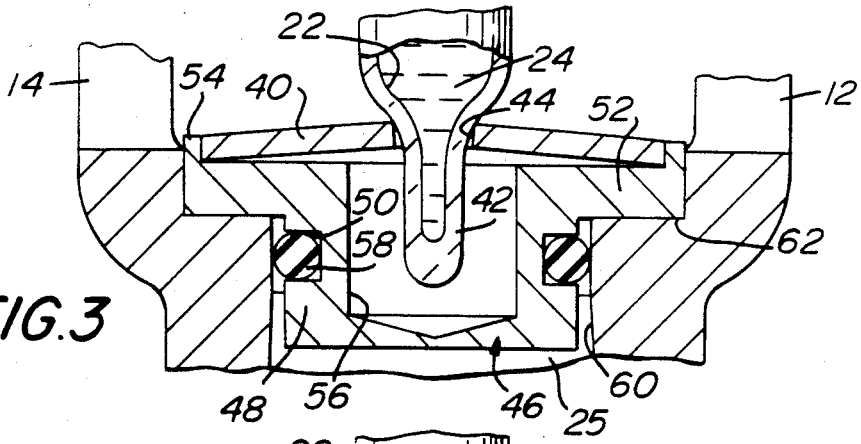
FIG.3
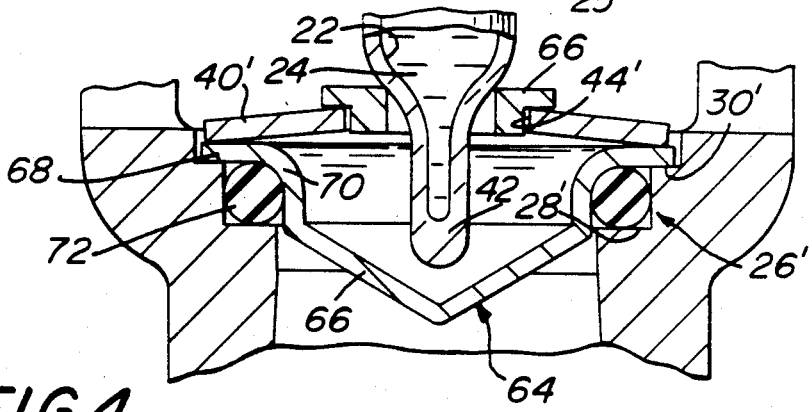
FIG.4

QUICK RELEASE VALVE FOR SPRINKLER HEAD

BACKGROUND OF THE INVENTION

The invention is directed to a quick release valve for a sprinkler head wherein a thermal responsive frangible element such as a glass bulb is used as the triggering element. The sprinkler head is coupled to a conduit which provides a pressurized fluid, such as water, for extinguishing a fire.

A sprinkler head wherein the compressive preload on the frangible element is reduced without substantially compromising the valve seal is disclosed in U.S. Pat. No. 4,167,974 (Job). The frangible element is mounted between the head body and a preloaded Belleville washer mounted on the valve seat. The underside of the washer is exposed to fluid at the valve flow passage so that the fluid impinges directly on the washer. This results in a uniform distribution of fluid pressure over the bottom surface of the preloaded washer whereby the washer will flex to accommodate fluid pressures experienced during normal operation.

The problem solved by the present invention is that of reducing the compressive preload required to protect the frangible element during normal operation by as much as 60%. As a result, lightweight and thinner walled frangible elements may be employed so as to provide a quicker response or triggering action (breakage) at the selected threshold temperature, all without compromising the frangible element or the valve seal.

BRIEF SUMMARY OF THE INVENTION

A quick release valve for a sprinkler head which includes a valve flow passage and a valve seat. A thermal responsive frangible element, such as a glass bulb, is mounted between the sprinkler head body and a spring means. A seal means is disposed below the spring means at the valve seat so as to seal the valve flow passage while deflecting fluid pressure to a peripheral region of the spring means. The seal means prevents fluid from impinging directly on the spring means. It is preferred that the seal means comprise a rigid seal cap and an O-ring in sealing contact with the seal cap and either the valve seat or the wall of the flow passage.

For the purpose of illustrating the invention, there are shown in the drawings various forms which are presently preferred; it being understood, however, that this invention is not limited to the precise arrangements and instrumentalities shown.

BRIEF DESCRIPTION OF THE DRAWINGS

FIG. 2 is a partial section of a second embodiment of the quick release valve.

FIG. 3 is a partial section of a third embodiment of the quick release valve.

FIG. 4 is a partial section of a fourth embodiment of the quick release valve.

DETAILED DESCRIPTION OF INVENTION

Figure 1:
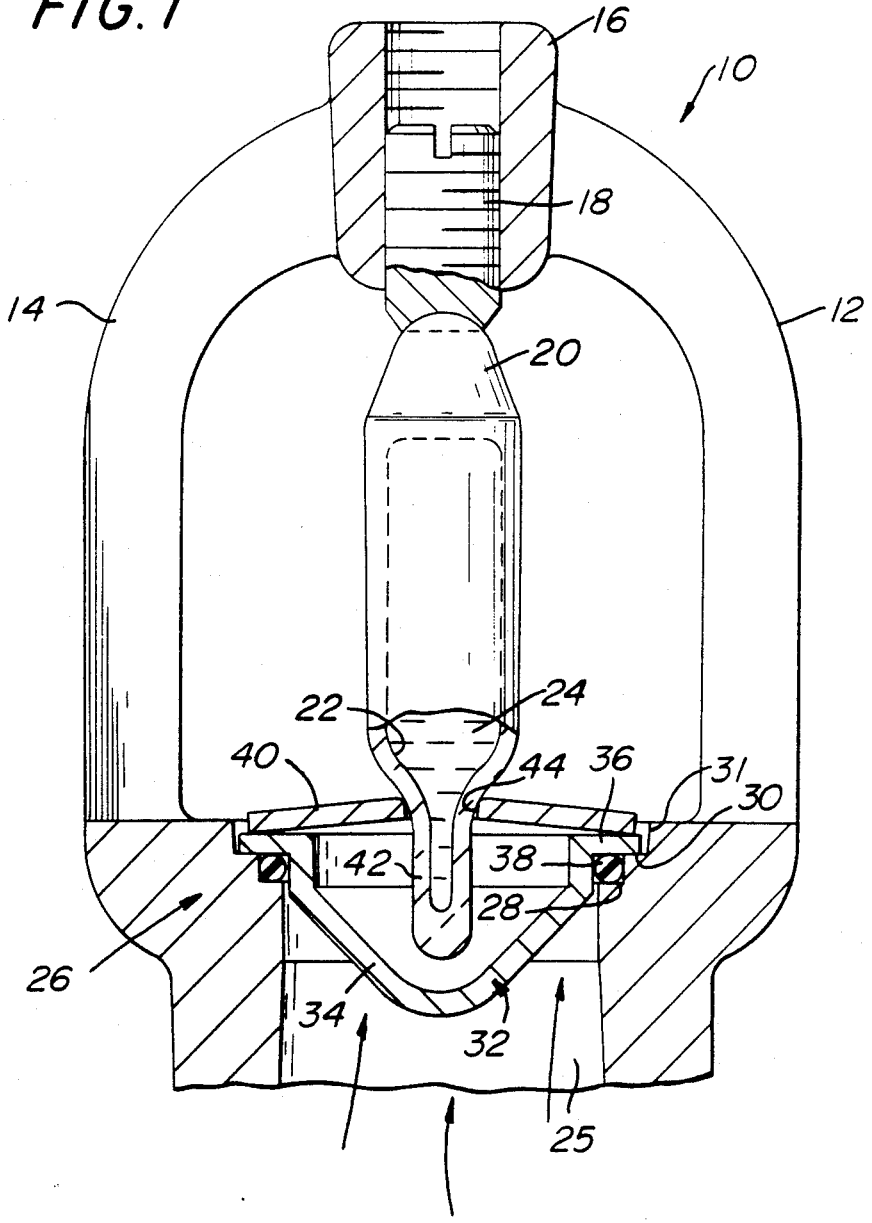
FIG. 1 is a partial cross section of a first embodiment of the quick release valve of the present invention.

Referring to the drawings, wherein like numerals indicate like elements, there is shown in FIG. 1 an embodiment of the quick release valve of the present invention incorporated in a sprinkler head designated generally as 10. The sprinkler head body includes a pair of arms 12, 14 integral with a collar 16 provided with a threaded passage which retains a set screw 18. Set screw 18 is provided with a depression at its bottom end for accommodating the head of a thermal responsive frangible element such as a glass bulb 20. The glass bulb is provided with an internal chamber 22 which carries a fluid 24, such as an alcohol mixture, which expands with increasing temperatures so as to cause the bulb wall to fracture and thereby trigger (open) the valve.

The sprinkler head body is provided with flow passage 25 which is adapted to be coupled to a pressurized fluid conduit as is well-known in the art. Pressurized fluid, typically water, enters the flow passage 25 as indicated by the arrows in FIG. 1. The flow passage 25 terminates in a valve seat 26 comprising a pair of annular shoulders 28, 30. A seal cap 32 having a generally conical shaped body portion 34 and an annular flange 36 is seated on shoulder 30. The seal cap is preferably copper. An O-ring 38, preferably Teflon (trademark), is captured under compression between the seal cap and shoulder 28 so as to provide the valve seal. A Teflon O-ring minimizes the problem of adhesion of the O-ring to a contact surface over long periods of time, ensuring quick release of the valve seal upon fracture of bulb 20.

A disk-shaped Belleville spring washer 40 is mounted on seal cap 32 at flange 36. The nose 42 of bulb 20 protrudes through a centrally located opening 44 in washer 40. The circumferential edge of opening 44 may be rounded to dissipate the forces at the contact points between the bulb and washer. Opening 44 is preferably aligned with the central longitudinal axis of flow passage 25. An annular clearance is provided between the circular periphery of washer 40 and the circular shoulder 31 so as to permit deflection of the spring washer under a compressive preload.

The compressive preload is obtained by adjusting set screw 18 so as to provide the desired compressive force on the bulb between the rigid sprinkler head body and spring washer 40. Thus, under normal operating conditions, fluid pressure is localized by seal cap 32 to the annular periphery of spring washer 40, resulting in deflection of the washer to accommodate increases in fluid pressure. The washer acts as a buffer, flexing so as to prevent increases in fluid pressure from reaching the bulb 20. Momentary fluid pressure surges which cause maximum deflection of the washer, and which cannot be buffered fully by the washer, result in upward displacement of cap 32 and washer 40. However, the valve seal is preserved by O-ring 38 since the O-ring expands as the seal cap is displaced under fluid pressure so as to remain in sealing contact with the cap and valve seat. By way of example, shoulder 28 may be 0.032–0.035 inch high and across while O-ring 38 may be 0.039 inch wide (thickness or diameter) with an i.d. of 0.441 inch to provide the desired sealing contact between the O-ring and the valve seat.

Referring to FIG. 2, there is shown an alternative embodiment of the invention wherein a modified seal cap 32' is employed. Seal cap 32' (preferably copper) is provided with a conical shaped body portion 34', an annular flange portion 36' and a circular peripheral lip 45 which serves to centralize the washer 40 during assembly. Operation of the valve is otherwise the same as already described in connection with FIG. 1.

Referring to FIG. 3, there is shown a further embodiment of the invention utilizing a seal cap 46 (preferably brass) having a cylindrical shaped body portion 48, an annular shaped wall recess or groove 50, an annular flange portion 52 and a circular peripheral lip 54. Lip 54 serves to centralize washer 40 during assembly. Bulb nose 42 protrudes below the washer within a cavity 56 provided in seal cap 46. An O-ring 58, preferably Teflon (trademark), is captured under compression between the flow passage wall 60 and wall recess 50 such that the clearance between the cylindrical body portion 48 and wall 60 is obstructed by the O-ring. The thickness or diameter of O-ring 58 is chosen so that the O-ring is squeezed between the cap 46 and wall 60 so as to provide the valve seal.

For the embodiment shown in FIG. 3, the valve seat is formed by a single annular shoulder 62 which supports the flange portion 52 of seal cap 46. Under normal operating conditions over the long term, fluid pressure is deflected by seal cap 46 to the annular peripheral region of washer 40 so as to produce deflection of the washer whereby the washer acts as a shock absorber and buffers the bulb 20. Under surge conditions, when the maximum deflection of the washer 40 is experienced, the seal cap 46 and washer 40 may be displaced upwardly but the cap O-ring wipes against wall 60 so as to preserve the valve seal.

Referring to FIG. 4, there is shown another embodiment of the invention which utilizes a different seal cap 64 and a modified washer 40' having an enlarged central opening 44' suited to accommodate a bulb saddle 66. The seal cap and bulb saddle are preferably copper. The seal cap is provided with a conical shaped body portion 66 and an annular flange 68 connected by a rounded section 70 to portion 66. Washer 40' is mounted on flange portion 68 of seal cap 64; and flange portion 68 is mounted on shoulder 30' of valve seat 26'. An O-ring 72 is captured under compression between the rounded section 70 of seal cap 64 and the valve seat shoulder 28'. O-ring 72 may be made of silicone and may be 0.070 inch thick with an i.d. of 0.426 inch. Under normal operating conditions over the long term, fluid pressure is deflected via seal cap 64 to the annular peripheral region of washer 40' so as to flex the washer. The washer acts as a buffer, protecting the bulb from breakage as already desribed in connection with FIGS. 1–3. Under surge conditions, when the maximum deflection of washer 40' is experienced, the washer cannot buffer the entire fluid force. As a result, the seal cap 64 is displaced upwardly with washer 40', but O-ring 72 expands as the seal cap is displaced so as to preserve the valve seal.

It should be understood that, in the embodiments shown in FIGS. 2–4, the same bulb preload structure is employed as shown in FIG. 1. Thus, for each embodiment of FIGS. 2–4, the arms 12, 14 of the sprinkler head are connected to a collar 16 provided with a set screw 18 as already described, and the set screw is advanced in the threaded passage of the collar so as to provide the desired compressive preload for bulb 20. In all instances, compressive preloads in the order of 40–60 lbs will permit the spring washer to flex and protect the bulb over the normal range of fluid pressures and the O-ring between the seal cap and the valve seat (or between the seal cap and the flow passage wall) will preserve the valve seal under surge pressure conditions. Typical compressive preload forces in the prior art, such as disclosed in U.S. Pat. No. 4,167,974, are in the order of 100(+)lbs. Thus, the present invention makes possible a reduction in compressive preload of as much as 60%. As a result, thinner walled and faster acting glass bulbs may be employed to ensure quicker release of the valve without compromising the bulb or the valve seal.

It should be appreciated that in all of the embodiments of the invention, the seal cap prevents fluid from impinging directly on the underside of the Belleville washer, deflecting the fluid forces instead to the annular peripheral region of the washer so as to produce the desired washer flexure. In addition, in all embodiments, the O-ring is maintained in sealing relation between the seal cap and the valve seat or between the seal cap and the flow passage wall so as to provide the valve seal. Thus, the functions of buffering the glass bulb under normal fluid pressures and preserving the valve seal under surge conditions are segregated, the buffering function being performed by the Belleville washer and the sealing function being performed by the seal cap and O-ring.

The present invention may be embodied in other specific forms without departing from the spirit or essential attributes thereof and, accordingly, reference should be made to the appended claims, rather than to the foregoing specification, as indicating the scope of the invention.

I claim:

1. Quick release valve for a sprinkler head having a valve flow passage and a valve seat, comprising:

a thermal responsive frangible element, means for exerting a compressive preload on the frangible element including spring means for resiliently supporting said frangible element, and seal means mounted on the valve seat for sealing the valve flow passage including means for diverting fluid pressure to a peripheral region of said spring means.

2. Quick release valve according to claim 1 wherein said fluid pressure diverting means includes a generally conical shaped cap and said seal means includes an O-ring in sealing contact with said valve seat and cap.

3. Quick release valve according to claim 1 wherein said fluid pressure diverting means includes a generally cylindrical shaped cap and said seal means includes an O-ring in sealing contact with the cap and the wall of said flow passage.

4. Quick release valve according to claim 1 wherein said spring means is a Belleville washer.

5. Quick release valve according to claim 4 wherein said thermal responsive frangible element is mounted centrally on said washer and axially with respect to said flow passage.

6. Quick release valve according to claim 5 including a saddle mounted centrally on said washer, said frangible element being mounted on said saddle.

7. Quick release valve according to claim 1 wherein said seal means is provided with structure for locating said spring means thereon.

8. Quick release valve for a sprinkler head including a valve flow passage and a valve seat, comprising:

a thermal responsive frangible element, means for exerting a compressive preload on the frangible element including spring means for resiliently supporting said frangible element, seal means mounted on the valve seat for sealing the valve flow passage, and said seal means being disposed below said spring means so as to contact and support said spring means at a peripheral region of said spring means whereby said seal means diverts fluid pressure to said spring means peripheral region.

9. Quick release valve according to claim 8 wherein said seal means includes a generally conical shaped cap and an O-ring in sealing contact with said valve seat and cap.

10. Quick release valve according to claim 8 wherein said seal means includes a generally cylindrical shaped cap and an O-ring in sealing contact with the cap and the wall of said valve flow passage.

11. Quick release valve according to claim 9 wherein said spring means is a Belleville washer.

12. Quick release valve according to claim 11 wherein said thermal responsive element is mounted centrally on said washer and axially with respect to said flow passage.

13. Quick release valve according to claim 12 including a saddle mounted centrally on said washer, said frangible element being mounted on said saddle.

14. Quick release valve according to claim 8 wherein said seal means is provided with structure for locating said spring means thereon.

* * * * *